United States Patent
Choi et al.

(10) Patent No.: US 8,724,728 B2
(45) Date of Patent: May 13, 2014

(54) METHOD OF GENERATING ADAPTIVE CODEBOOK AND MULTIPLE INPUT MULTIPLE OUTPUT COMMUNICATION SYSTEM USING THE ADAPTIVE CODEBOOK

(75) Inventors: Jun Il Choi, Seoul (KR); Bruno Clerckx, Seoul (KR); Ki Il Kim, Yongin-si (KR); David J. Love, West Lafayette, IN (US); Taejoon Kim, West Lafayette, IN (US)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 259 days.

(21) Appl. No.: 12/957,964

(22) Filed: Dec. 1, 2010

(65) Prior Publication Data

US 2012/0140834 A1    Jun. 7, 2012

(51) Int. Cl.
*H04B 7/02* (2006.01)

(52) U.S. Cl.
USPC .......... 375/267; 375/260; 375/262; 375/265; 375/324; 375/343; 375/346; 375/347

(58) Field of Classification Search
CPC .. H04B 7/0369; H04B 7/0626; H04B 7/0417; H04B 7/024; H04B 7/0632; H04B 7/0469; H04B 7/0413; H04B 7/043; H04B 7/0452; H04B 7/0647; H04B 7/0636; H04L 5/001; H04L 27/2646; H04L 5/0046; H04L 5/0058
USPC .................. 375/260, 267, 265, 324, 346, 347
See application file for complete search history.

(56) References Cited

U.S. PATENT DOCUMENTS

| 2007/0174038 A1* | 7/2007 | Wang et al. ............... 704/1 |
| 2008/0192849 A1 | 8/2008 | Kim et al. |
| 2008/0225960 A1* | 9/2008 | Kotecha et al. ............... 375/259 |
| 2009/0122857 A1 | 5/2009 | Li et al. |
| 2010/0002801 A1 | 1/2010 | Jia et al. |
| 2010/0046461 A1 | 2/2010 | Wennstrom |
| 2010/0046643 A1 | 2/2010 | Mondal et al. |

FOREIGN PATENT DOCUMENTS

| KR | 10-2009-0017352 | 2/2009 |
| KR | 10-2009-0117583 | 11/2009 |
| KR | 10-2010-0028859 | 3/2010 |
| KR | 10-2010-0044085 | 4/2010 |

OTHER PUBLICATIONS

Bruno Clerckx and David Mazzarese "Multiuser MIMO downlink made Practical : Application to 802.16m" , 2009 IEEE.*
Front pages Istavan Frigyes, Peter Bakki, Janos Bito, Advances in Mobile and Wireless communications Views of 16th IST Mobile and Wireless Communication Summit, 2008.*

(Continued)

*Primary Examiner* — Dhaval Patel
(74) *Attorney, Agent, or Firm* — NSIP Law

(57) ABSTRACT

Provided is a method of generating an adaptive codebook and a multiple input multiple output (MIMO) communication system using the adaptive codebook. A transmitter and a receiver may generate, from a base codebook based on a matrix associated with statistics of a channel matrix, the adaptive codebook maintaining a unitary characteristic. The transmitter may perform scheduling, transmit filter design, and precoding using adaptive codebook based feedback information.

18 Claims, 10 Drawing Sheets

(56) References Cited

OTHER PUBLICATIONS

Chapter II—Simplified Channel-Aware greedy scheduling and antenna selection algorithms for multiuer MIMO sytems employing Orthogonal space division multiplexing.*

Shreeram Sigdel & Witold Krzymien; Chapter II—Simplified Channel-Aware greedy scheduling and antenna selection algorithms for multiuer MIMO sytems employing Orthogonal space division multiplexing, Advances in Mobile and wireless communications, Lecture notes Electrical Engineering vol. 16, 2008, pp. 23-51.*

* cited by examiner

METHOD OF GENERATING ADAPTIVE CODEBOOK AND MULTIPLE INPUT MULTIPLE OUTPUT COMMUNICATION SYSTEM USING THE ADAPTIVE CODEBOOK

BACKGROUND

1. Field

The following description relates to a multiple input multiple output (MIMO) communication system using a codebook.

2. Description of Related Art

A multiple input multiple output (MIMO) communication system may provide a variety of enhanced multimedia services including a voice service in a wireless communication system by employing a plurality of channels in a spatial area.

In the MIMO communication system, a base station and terminals may share channel information, and may use a codebook to generate an optimal precoding matrix. The base station and the terminals may share channel information using codewords included in the codebook, and may generate an appropriate precoding matrix.

A particular space may be quantized to a plurality of codewords. The plurality of codewords generated by quantizing the particular space may be stored as a codebook in each of the base station and the terminals. Each of the codewords may be a vector or a matrix.

SUMMARY

The following description relates to a method of generating an adaptive codebook and a multiple input multiple output (MIMO) communication system using the adaptive codebook.

The foregoing and/or other features and aspects may be achieved by providing a communication method of a transmitter includes generating second codewords corresponding to first codewords included in a first codebook within a set including unitary matrices, based on a matrix associated with statistics of a channel matrix between the transmitter and a receiver, receiving, from the receiver, information associated with at least one second codeword selected by the receiver from the generated second codewords, and performing precoding based on information associated with the selected at least one second codeword.

The generating may include generating the second codewords corresponding to the first codewords included in the first codebook within the set including the unitary matrices, based on the matrix associated with the statistics of the channel matrix and a matrix associated with channel quality information.

The generating may include generating the second codewords corresponding to the first codewords using a Procrustes optimization scheme.

The receiving may include receiving information associated with at least one codeword index corresponding to the selected at least one second codeword, or information associated with at least one quantized channel covariance matrix that is computed based on the selected at least one second codeword.

The performing precoding may include generating at least one quantized channel covariance matrix based on at least one codeword index corresponding to the selected at least one second codeword, in response to the received information associated with the selected at least one second codeword including information associated with the at least one codeword index, and performing precoding based on the at least one quantized channel covariance matrix.

The performing precoding may include performing precoding based on at least one quantized channel covariance matrix in response to the received information associated with the selected at least one second codeword including information associated with the at least one quantized channel covariance matrix that is computed based on the selected at least one second codeword.

The performing precoding may include generating a transmit filter weight of the transmitter, based on a receive filter weight of the receiver and at least one quantized channel covariance matrix that is computed based on the received information associated with the selected at least one second codeword, and performing precoding using the transmit filter weight.

The communication method may further include computing a channel subspace correlation between the receiver and at least one second receiver different from the receiver, based on at least one quantized channel covariance matrix that is computed based on the received information associated with the selected at least one codeword, and a quantized channel covariance matrix of the at least one receiver, and performing scheduling based on a comparison between the channel subspace correlation and a threshold. The performing precoding may include performing precoding based on information associated with the selected at least one second codeword in response to the receiver being scheduled.

The foregoing and/or other features and aspects may also be achieved by providing a communication method of a receiver includes generating second codewords corresponding to first codewords included in a first codebook within a set including unitary matrices, based on a matrix associated with statistics of a channel matrix between a transmitter and the receiver, selecting at least one second codeword from the generated second codewords, and feeding back, to the transmitter, information associated with the selected at least one second codeword.

The generating may include generating the second codewords corresponding to the first codewords included in the first codebook within the set including the unitary matrices, based on the matrix associated with the statistics of the channel matrix and a matrix associated with channel quality information.

The generating may include generating the second codewords corresponding to the first codewords using a Procrustes optimization scheme.

The feeding back may include feeding back, to the transmitter, information associated with at least one codeword index corresponding to the selected at least one second codeword.

The feeding back may include generating at least one quantized channel covariance matrix based on the selected at least one second codeword, and feeding back, to the transmitter, information associated with the at least one quantized channel covariance matrix.

The foregoing and/or other features and aspects may also be achieved by providing a transmitter includes a memory to store a first codebook, a processor to generate second codewords corresponding to first codewords included in a first codebook within a set including unitary matrices, based on a matrix associated with statistics of a channel matrix between the transmitter and a receiver, a receiving unit to receive, from the receiver, information associated with at least one second codeword selected by the receiver from the generated second codewords, and a precoder to perform precoding based on information associated with the selected at least one second codeword.

The processor may generate the second codewords corresponding to the first codewords included in the first codebook within the set including the unitary matrices, based on the matrix associated with the statistics of the channel matrix and a matrix associated with channel quality information.

The processor may generate the second codewords corresponding to the first codewords using a Procrustes optimization scheme.

The receiving unit may receive information associated with at least one codeword index corresponding to the selected at least one second codeword, or information associated with at least one quantized channel covariance matrix that is computed based on the selected at least one second codeword.

In response to the receiving unit receiving information associated with at least one codeword index corresponding to the selected at least one second codeword, the processor may generate at least one quantized channel covariance matrix based on the selected at least one codeword index, and the precoder may perform precoding based on the at least one quantized channel covariance matrix.

In response to the receiving unit receiving information associated with at least one quantized channel covariance matrix that is computed based on the selected at least one second codeword, the precoder may perform precoding based on the at least one quantized channel covariance matrix.

The processor may generate a transmit filter weight of the transmitter, based on a receive filter weight of the receiver and at least one quantized channel covariance matrix that is computed based on the received information associated with the selected at least one second codeword. The precoder may perform precoding using the transmit filter weight.

The transmitter may further include a scheduler to compute a channel subspace correlation between the receiver and at least one second receiver different from the receiver, based on at least one quantized channel covariance matrix that is computed based on the received information associated with the selected at least one codeword and a quantized channel covariance matrix of the at least one receiver, and to perform scheduling based on a comparison between the channel subspace correlation and a threshold. The precoder may perform precoding based on information associated with the at least one second codeword in response to the receiver being scheduled.

According to various example embodiments, since an adaptive codebook maintaining a unitary characteristic is generated based on a base codebook and statistics of a channel matrix, it is possible that an adaptive mode may be used with respect to a rank greater than or equal to 2. In addition, a constrained feedback resource may be more effectively used.

According to various example embodiments, a transmit filter of a transmitter based on a receive filter of a receiver may be designed based on feedback information using an adaptive codebook.

According to various example embodiments, user scheduling may be more effectively performed based on feedback information using an adaptive codebook.

Other features and aspects will be apparent from the following detailed description, the drawings, and the claims.

BRIEF DESCRIPTION OF THE DRAWINGS

These and/or other aspects will become apparent and more readily appreciated from the following description of various example embodiments, taken in conjunction with the accompanying drawings briefly described below.

Figure 1:
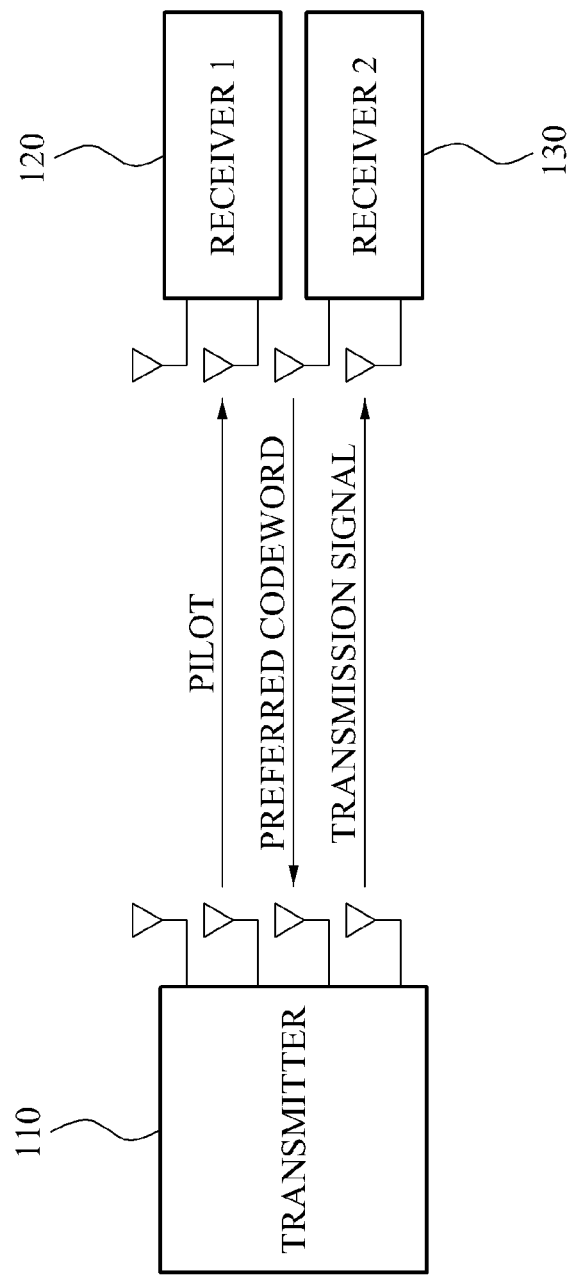
FIG. 1 is a diagram illustrating an example of a closed-loop multiple input multiple output (MIMO) communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of operations is not limited to that set forth herein and may be changed as is known in the art, with the exception of operations necessarily occurring in a certain order. Also, description of well-known functions and constructions may be omitted for increased clarity and conciseness.

A detailed description of various known functions or configurations they may be omitted for the sake of clarity. Also, terms used herein are defined to appropriately describe the embodiments and thus may be changed depending on a user, the intent of an operator, or a custom. Accordingly, the terms should be defined based on the following overall descriptions of example embodiments discussed in this specification.

FIG. 1 illustrates an example of a closed-loop multiple input multiple output (MIMO) communication system.

Referring to FIG. 1, the closed-loop MIMO communication system may include a transmitter 110, a receiver (1) 120, and a receiver (2) 130. FIG. 1 illustrates an example of a multi-user MIMO communication system. Embodiments may be applicable to a single-user MIMO communication system. The term "closed-loop" may indicate that each of the receiver (1) 120 and the receiver (2) 130 feeds back channel information to the transmitter 110, and that the transmitter 110 performs precoding using the channel information.

A plurality of transmit antennas, for example, two, four, eight, etc., transmit antennas may be installed in the transmitter 110. At least one receive antenna may be installed in each of the receiver (1) 120 and the receiver (2) 130. A channel may be formed between the transmitter and each of the receiver (1) 120 and the receiver (2) 130. Each of the receiver (1) 120 and the receiver (2) 130 may feed back, to the transmitter 110, channel information associated with the channel. In this example, the channel information may be generated based on different types of codebooks depending on feedback modes. For example, the feedback modes may include a base mode, a differential mode, an adaptive mode, and/or the like.

For example, in a case in which each of the transmitter 110, the receiver (1) 120, and the receiver (2) 130 operates based on the base mode, each of the receiver (1) 120 and the receiver (2) 130 may select, as a preferred base codeword, one of a plurality of base codewords included in a base codebook corresponding to the base mode, and may feed back, to the transmitter 110, a base codeword indicator corresponding to the preferred base codeword, for example, an index of the preferred base codeword. The transmitter 110 may recognize a base codeword indicator of each of the receiver (1) 120 and the receiver (2) 130, based on a pre-stored base codebook, and may determine an optimal precoding matrix based on the base codeword indicator of each of the receiver (1) 120 and the receiver (2) 130. Data streams desired to be transmitted by the transmitter 110 may be precoded by a precoding matrix, and then be transmitted to the receiver (1) 120 and the receiver (2) 130 via the transmit antennas installed in the transmitter 110.

In a case in which a MIMO communication system uses a fixed codebook as in a base mode, the fixed codebook may have a relatively great quantization error. Accordingly, a throughput of the MIMO communication system may be limited.

In a case in which each of the transmitter 110, the receiver (1) 120, and the receiver (2) 130 transforms the base codebook to an adaptive codebook and uses the transformed adaptive codebook as in an adaptive mode, the throughput of the MIMO communication system may be enhanced. In particular, in a case in which channels formed between the transmitter 110 and each of the receiver (1) 120 and the receiver (2) 130 have a relatively great spatial correlation, the adaptive mode may express a relatively narrow space using the same number of codewords as the base mode. Accordingly, it is possible to decrease a quantization error.

Figure 2:
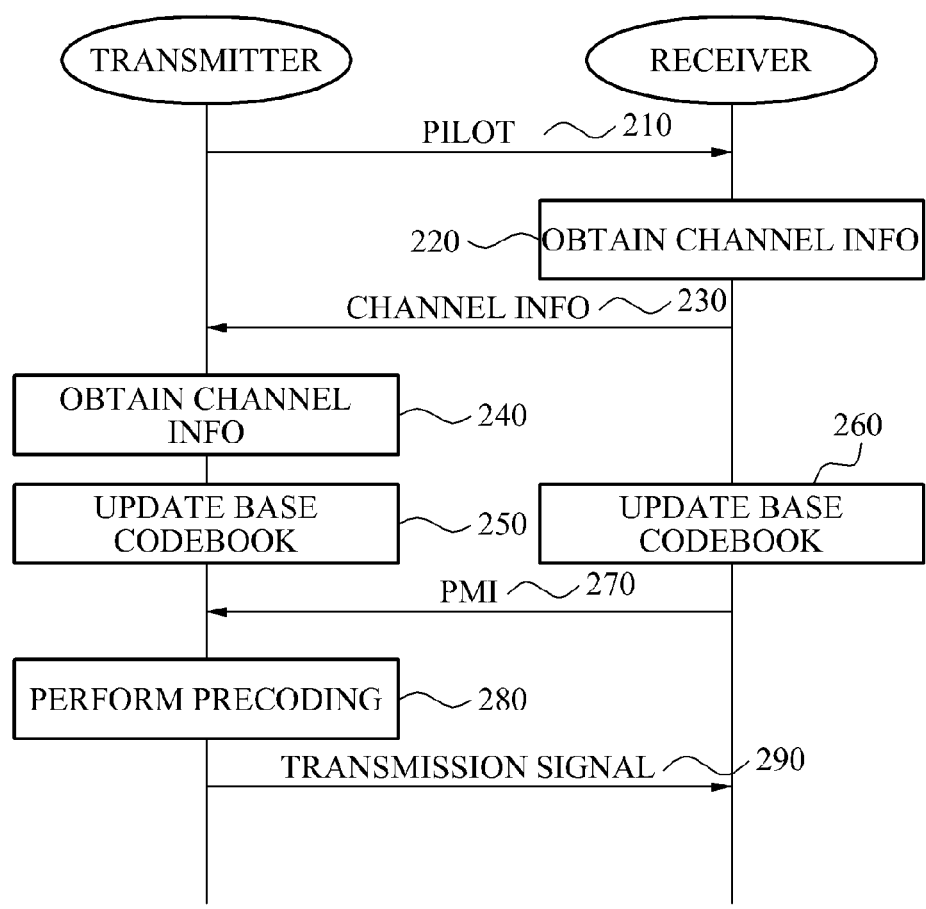
FIG. 2 is a diagram illustrating an example of a communication method of a transmitter and a receiver operating based on an adaptive mode in a closed-loop MIMO communication system.

FIG. 2 illustrates an example of a communication method of a transmitter and a receiver operating based on an adaptive mode in a closed-loop MIMO communication system.

Even though the transmitter may operate together with a plurality of receivers in the adaptive mode, as in one example described in reference to FIG. 1, the following description will be based on the transmitter and a single receiver for concise description.

Referring to FIG. 2, in operation 210, the transmitter may transmit a pilot to the receiver. The pilot may correspond to a signal well known to both the transmitter and the receiver. In operation 220, the receiver may obtain channel information associated with a channel formed from the transmitter to the receiver using the pilot transmitted from the transmitter. The channel information may include a channel matrix H or a channel covariance matrix $H^H H$. The channel information may include a precoding matrix indicator (PMI) generated based on the channel matrix H or the channel covariance matrix $H^H H$, a preferred rank indicator (RI), channel quality information (CQI), or a combination of these and/or similar data.

In operation 230, the receiver may feed back estimated channel information to the transmitter. In operation 240, the transmitter may obtain the channel information.

In operations 250 and 260, each of the transmitter and receiver may generate an adaptive codebook by updating a base codebook based on accumulated channel information. Adaptive codebooks may be generated by applying the same method to other receivers in other example configurations including multiple receivers.

The receiver may select, as a preferred adaptive codebook, one of a plurality of adaptive codewords included in the adaptive codebook. In operation 270, the receiver may feed back, to the transmitter, an adaptive codeword indicator corresponding to the preferred adaptive codeword.

The transmitter may determine an optimal precoding matrix based on adaptive codeword indicators received from the one or more receivers. As previously noted, the presently described example embodiment only discusses one receiver for the sake of clarity. In operation 280, the transmitter may precode data streams desired to be transmitted using a precoding matrix. The precoded data streams may be transmitted to the receivers.

In an example of generating an adaptive codebook using spatial correlation of channels, and in response to a rank=1, adaptive codewords satisfying a unitary characteristic may be generated. However, in response to the rank≥2, the unitary characteristic of the adaptive codewords may be broken. Accordingly, proposed is a method that may generate the adaptive codebook satisfying the unitary characteristic based on the spatial correlation of the channels regardless of a rank value.

Hereinafter, an example of generating the adaptive codebook based on the spatial correlation of channels will be described.

It may be assumed that K receivers are present in the MIMO communication system, a signal-to-noise ratio (SNR) is p, a number of antennas of the transmitter is $M_t$, and a number of antennas of each receiver is $M_r$. In this example, a channel matrix of an $i^{th}$ receiver may be expressed by $H_i \in C^{M_r \times M_t}$. There is no need that entries of the channel matrix $H_i$ be independent. The entries of the channel matrix $H_i$ may have a correlation, and $H_i$ may be modeled as follows:

$$H_i = G_i R_i, \ G_i \in C^{M_r \times M_t} \sim CN(0, I_{M_t}), R_i \in C^{M_r \times M_t}$$

Here, $R_i$ corresponds to a matrix associated with statistics of a channel matrix and a symmetric positive definite matrix, and $R_i^* R_i$ corresponds to a channel correlation matrix. It is assumed that $\text{rank}(R_i) = r$, and $R_i$ is known to all of the transmitter and the $i^{th}$ receiver. In this example, the following equation may be obtained:

$$Etr[H_i^* H_i] = tr(E[R_i^* G_i^* G_i R_i]) = M_t \cdot M_r$$

Here, the · operation indicates a scalar product. In every channel use, each receiver may feed back indices of short term PMI. A short term PMI of the $i^{th}$ receiver may correspond to $W_i \in W$ and $W_i \in C^{M_t \times r}$. $W = \{W_1, W_2, \ldots, W_N\}$ indicates a base codebook. Here, W may be obtained by quantizing a $M_t \times r$ unitary matrix space.

Here, it is assumed that the transmitter is aware of CQI $\Lambda_i$ including eigenvalues of $G_i^* G_i$.

$$\Lambda_i = \text{diag}(\lambda_1(G_i^* G_i), \ldots, \lambda_r(G_i^* G_i), 0, \ldots, 0)$$

In the above equation, $\lambda_i(A)$ corresponds to a dominant eigenvalue of an $i^{th}$ matrix A. A quantized channel covariance matrix may may be given by $Q_i = \alpha_i R_i^* W_i \Lambda_i W_i^* R_i$.

Here, $\alpha_i$ may be used to normalize $Q_i$ such that $\text{tr}(Q_i) = M_t \cdot M_r$, that is, to satisfy a condition of $Etr[H_i^* H_i] = \text{tr}(E[R_i^* G_i^* G_i R_i]) = M_t \cdot M_r$.

Hereinafter, a basic method to quantize a channel using $W_i$ will be described. An optimal $W_i \in W$ may be selected according to Equation 1:

Quantization 1: [Equation 1]

$$W_i = \underset{W \in \mathcal{W}}{\arg\min} \left\| \frac{H_i^* H_i}{tr(H_i^* H_i)} - \frac{R_i^* W \Lambda_i W^* R_i}{tr(R_i^* W \Lambda_i W^* R_i)} \right\|_F^2$$

Quantization 2:

$$W_i = \underset{W \in \mathcal{W}}{\arg\min} 1 - \left| vec\left( \frac{H_i^* H_i}{tr(H_i^* H_i)} \right)^* vec\left( \frac{R_i^* W \Lambda_i W^* R_i}{tr(R_i^* W \Lambda_i W^* R_i)} \right) \right|^2$$

In Equation 1, $vec(\cdot)$ corresponds to an operator for converting a matrix to a vector. A method of enhancing a performance of quantization expressed by Equation 1 will be described later.

A transmit filter weight for the $i^{th}$ receiver may be expressed by $t_i$. $t_i$ may be designed based on $\{Q_k\}_{k=1}^K$. Maximum ratio combining (MRC) may be used for a receive filter weight $r_i$ of the $i^{th}$ receiver. The receive filter weight may be expressed by $$r_i = \frac{H_i t_i}{\|H_i t_i\|}.$$

A signal received at the $i^{th}$ receiver may be given by, $$y_i = r_j^* \sqrt{\frac{\rho}{K}} \left( H_j t_j \left| \sum_{k \neq j} H_k t_k \right| v_i \right).$$

Each entry of $v_i$ may be distributed like $CN(0,1)$.

<Basic Transmit Filter Algorithm and Receive Scheduling Algorithm>

A transmit filter may be designed based on a signal-to-leakage plus noise ratio (SLNR) criterion. In a MIMO communication system in which a total of K receivers exist, a total of $M = \min(K, M_t)$ receivers may be scheduled according to a successive user scheduling scheme and an exhaustive user scheduling scheme. The successive user scheduling scheme corresponds to a scheduling scheme that can be substantially readily configured. For example, with respect to a total of K receivers, the exhaustive user scheduling scheme may request a search $$\binom{K}{M} = \frac{\prod_{i=0}^{M-1}(K-i)}{M!}$$

times, whereas the successive user scheduling scheme may request only a simple single user search $$\sum_{i=0}^{N-1}(K-i)$$

times. Accordingly, as K increases, a complexity of the successive user scheduling scheme may linearly increase, whereas a complexity of the exhaustive user scheduling may increase in a polynomial order. However, the exhaustive user scheduling scheme may output a relatively better result than the successive user scheduling scheme.

Hereinafter, a basic transmit filter design algorithm associated with the successive user scheduling scheme and the exhaustive user scheduling scheme will be described.

—Basic Successive User Scheduling Scheme—

Initialization: $J_0 = \phi$, $k=1$, $S=\{1, \ldots, K\}$

When (k-1) receivers are scheduled where a set of the (k-1) receivers are expressed by $J_{k-1} = \{j_1, j_2, \ldots, j_{k-1}\}$, SLNR with respect to the $i^{th}$ receiver where $i \notin J_{k-1}$ may be defined as follows:

$$l(k, i, t_i, J_{k-1}) = \frac{\frac{\rho}{k} t_i^* Q_i t_i}{1 + \sum_{j \in J_{k-1}} \frac{\rho}{k} t_i^* Q_j t_i}$$

An optimal transmit filter weight $t_i$ may be determined by, $$t_i = \underset{t}{\arg\max}\, l(k, i, t, J_{k-1})$$

$$= \frac{\max eigvec(B^{-1} Q_i)}{\|\max eigvec(B^{-1} Q_i)\|}$$

Here, $B = I_{M_t} + T$ and $T = \frac{\rho}{k} \sum_{j \in J_{k-1}} Q_j$.

$$(j_1, t_{j_1}) = \underset{i \in S, t_i}{\arg\max}\, l(1, i, t_i, J_0)$$

may be computed, and $J_1 = J_0 \cup j_1$ and $S = S \setminus j$, may be set.

In addition, SINR may be defined as follows:

$$s(k, j_k, t_{j_k}, J_k) = \frac{\frac{\rho}{k} t_{j_k}^* Q_{j_k} t_{j_k}}{1 + \sum_{j \in J_k, j \neq j_k} \frac{\rho}{k} \left| \frac{t_{j_k}^* Q_{j_k} t_j}{(t_{j_k}^* Q_{j_k} t_{j_k})^{1/2}} \right|^2}$$

When $k=1$, sumrate $= \log 2(1 + s(1, j_1, t_{j_1}, J_1))$ may be set.

While $k < M_t$, the following process may be repeated:

While $k < M_t$
  (a) Repeat:

---

K = K + 1
for i = 1 : |S|

Compute $t_i = \underset{t}{\arg\max}\, l(k, S(i), t, J_{k-1})$

Set $J_k'' = J_{k-1} \cup S(i)$ $\text{metric}(i) = \sum_{j \in J_k^*} \log_2(1 + s(k, j, t_j, J_k^*))$ end b = $\underset{i}{\arg\max}\, \text{metric}(i)$ sumrate' = metric(b)
$J_k' = J_{k-1} \cup S(b)$, $S' = S \setminus S(b)$
if sumrate' > sumrate, set $J = J_k = J_k'$, $S = S'$, sumrate = sumrate', and go to (a).
Otherwise, $J = J_{k-1}$ and break.
end While

---

J corresponds to a set of scheduled receivers, and $\{t_{j \in J}\}$ corresponds to a set of transmit filters.

—Basic Exhaustive User Scheduling Scheme—
Initialization: M=min($M_t$, K), S={1, ..., K}, sumrate'=0
Z corresponds to a group of all the probable combinations for selecting M receivers among K receivers. For example, when K=5 and M=3, $$\binom{5}{3} = 10.$$

In this example,
Z={{1,2,3}, {1,2,4}, {1,2,5}, {1,3,4}, {1,3,5}, ..., {3,4,5}}, and
Z(1)={1,2,3}, Z(2)={1,2,4}, ... Z(10)={3,4,5}.

J corresponds to a set of scheduled receivers, and T={$t_k$}$_{k \in J}$ corresponds to a set of transmit filters. J and {$t_k$}$_{k \in J}$ may be obtained according to the following algorithm.

```
for i = 1:|Z|
    J_M = Z(i)
    for j = 1:M
        J_{M-1} = J_M\J_M(j)

Compute t_{J_M(j)} = arg max l(M, J_M(j), t, J_{M-1})
                              t end For
    sumrate" = 0
    for j = 1:M
        J_{M-1} = J_M\J_M(j)
        Compute sumrate "= sumrate" + log 2(1 + s(M, J_M (j), t_{J_M(j)}, J_M))
    end for
    If sumrate" > sumrate'
        sumrate' = sumrate"
        J = J_M
        T = {t_k}_{k∈J_M}
    end if
end for
```

Hereinafter, a method of generating an adaptive codebook and a transmit filter design and receiver scheduling algorithm based on the adaptive codebook will be described.

<Adaptive Codebook Generation Method>

Hereinafter, two schemes of generating an adaptive codebook based on a matrix $R_i$ associated with statistics of a channel matrix, and $CQI^{\Lambda}_i$, and selecting an optimal adaptive codeword included in the adaptive codebook will be described. Information associated with the selected codeword may be fed back from the receiver to the transmitter.

Two schemes for quantizing a channel, for example, two schemes for selecting an adaptive codeword to be fed back from the receiver to the transmitter may be expressed by Equation 2:

Adaptive quantization 1: [Equation 2]

$$W_{i,trans} = \underset{W \in W}{\arg\min} \left\| \frac{H_i^* H_i}{tr(H_i^* H_i)} - \frac{R_i^* T(W)\Lambda_i T(W)^* R_i}{tr(R_i^* T(W)\Lambda_i T(W)^* R_i)} \right\|_F^2$$

Adaptive quantization 2:

$$W_{i,trans} = \underset{W \in W}{\arg\min} - \left| vec\left(\frac{H_i^* H_i}{tr(H_i^* H_i)}\right)^* vec\left(\frac{R_i^* T(W)\Lambda_i T(W)^* R_i}{tr(R_i^* T(W)\Lambda_i T(W)^* R_i)}\right) \right|^2$$

In Equation 2, T(W) corresponds to a codeword of the adaptive codebook that is transformed based on a base codebook W. The base codebook W may be generated by quantizing the whole $M_t \times r$ dimensional unitary subspace. Accordingly, the base codebook W is not necessarily a subspace codebook matched to channel subspace $R_i$ or $H_i$. The channel subspace may be expressed by the matrix associated with the statistics of the channel matrix.

—Adaptive Codebook Generation Method when Rank=1—

When W is constrained as a vector, a method of transforming base codewords to adaptive codewords so that the adaptive codewords may be mapped to $M_t \times 1$ dimensional channel subspace $R_i$ may be expressed as follows:

$$T(W) = \frac{R_i W}{\|R_i W\|}$$

The above method is to project $R_i W$ onto a unit sphere through a radical direction. Consequently, the adaptive codeword T(W) may form a basis of the channel subspace $R_i$.

—Adaptive Codebook Generation Method Applicable when Rank≥2—

When W is a matrix, adaptive codewords included in the adaptive codebook may be generated by transforming base codewords to form the basis of the $M_t \times 1$ channel subspace $R_i$. Generation of the adaptive codebook may be performed by both the transmitter and the receiver. Accordingly, the transmitter and the receiver may have the same adaptive codebook. Depending on a type of information of the transmitter and the receiver, two transformation schemes may be expressed by Equation 3 and Equation 4:

Transformation 1: [Equation 3]

$$T_1(W) = \underset{V \in C^{M_t \times r}, V^*V = I_r}{\arg\min} \|W^* R_i - V^*\|_F$$

Transformation 2: [Equation 4]

$$T_2(W) = \underset{V \in C^{M_t \times r}, V^*V = I_r}{\arg\min} \|\Lambda_i^{1/2} W^* R_i - V^*\|_F$$

The adaptive codebook $W_{trans}$ may be obtained by performing the above transformation with respect to all the base codewords W included in the base codebook W.

Transformation 1 may transform the base codeword W to the adaptive codeword $T_1(W)$ based on the matrix $R_i$ associated with statistics of the channel matrix. Here, $R_i$ may correspond to long term information.

Transformation 2 may transform the base codeword W to the adaptive codeword $T_1(W)$ based on both the matrix $R_i$ associated with the statistics of the channel matrix and $\Lambda_i$ that is CQI. Here, the CQI may correspond to short term information.

Accordingly, when the transmitter and the receiver are unaware of CQI, transformation 1 may be used. Conversely, when the transmitter and the receiver are aware of CQI, transformation 2 may be used. Even though the transmitter and the receiver are aware of CQI, transformation 1 can be employed.

Optimal V of Equation 3 and Equation 4 may be obtained using a Procrustes optimization scheme. For example, optimal $T_1(W)$ and $T_2(W)$ may be respectively determined according to Equation 5 and Equation 6:

$$W^* R_i^{SVD} = U_1 \Sigma_1 V_1^* \rightarrow T_1(W) = (U_1 V_1(:,1:r)^*)^* \quad \text{[Equation 5]}$$

$$\Lambda_i^{1/2} W^* R_i^{SVD} = U_2 \Sigma_2 V_2^* \rightarrow T_2(W) = (U_2 V_2(:,1:r)^*)^* \quad \text{[Equation 6]}$$

When quantization of Equation 2 is performed using the adaptive codewords generated by transformation 1 or transformation 2, the quantized channel covariance matrix may be given by, $$Q_{i,trans} = \alpha_i R_i {}^* W_{i,trans} \Lambda_i W_{i,trans} {}^* R_i$$

Here, $\alpha_i$ may be used to normalize $Q_{i,trans}$, and may satisfy $tr(Q_{i,trans})=M_r \cdot M_t$. $W_{i,trans}$ may correspond to an adaptive codeword selected by the $i^{th}$ receiver.

Accordingly, <basic transmit filter design and receiver scheduling algorithm> may be modified by employing $\{Q_{i,trans}\}_{i=1}^{K}$ instead of $\{Q_1\}_{i=1}^{K}$.

The aforementioned adaptive codebook use method may also be applicable to implicit feedback as well as explicit feedback. The transmitter and the receiver may employ the explicit feedback of feeding back the channel covariance matrix quantized based on $T_1(W)$ or $T_2(W)$, and may also employ the implicit feedback of feeding back $T_1(W)$ or $T_2(W)$. In addition, when rank=1, and when rank≥2, it is possible to perform channel quantization using codewords transformed according to an example embodiment, and to use the quantization result for feedback.

For example, when rank≥2, the transmitter and the receiver may generate the adaptive codebook satisfying the unitary characteristic, based on the matrix $R_i$ associated with the statistics of the channel matrix. When rank=1, the transmitter and the receiver may generate the adaptive codebook using the same method.

<Adaptive Transmit Filter Design>

Hereinafter, a method of applying, to transmit filter design and receiver scheduling, a receive filter weight assumed as MRC will be described. For example, the transmit filter may be designed based on the receive filter weight.

When the transmit filter weight is $t_i$ and and the receive filter weight $r_i (r_i = H_i t_i / \|H_i t_i\|)$, SLNR of the $i^{th}$ receiver based on channel information may be expressed by, $$SLNR = \frac{\frac{\rho}{K}\|H_i t_i\|^2}{1 + \frac{\rho}{K}\sum_{j \neq i}^{K} \frac{|t_j H_j^* H_j t_i|^2}{\|H_j t_i\|}}$$

Accordingly, the modified SLNR may be expressed by Equation 7:

$$l_{Rx}(k, i, t_i, J_{k-1}) = \frac{\frac{\rho}{k} t_i^* Q_i t_i}{1 + \sum_{j \in J_{k-1}} \frac{\rho}{k}\left|\frac{t_j^* Q_j t_i}{(t_j^* Q_j t_j)^{1/2}}\right|^2} \quad [\text{Equation 7}]$$

Instead of SLNR of <basic transmit filter design and receiver scheduling algorithm>, modified SLNR $l_{Rx}(k,i,t_i,J_{k-1})$ may be applied. Accordingly, based on the modified SLNR of Equation 7, the optimal transmit filter weight may may be determined by Equation 8:

$$t_i = \arg\max_t l_{Rx}(k, i, t, J_{k-1}) \quad [\text{Equation 8}]$$

$$= \frac{\max eigvec(B^{-1}Q_i)}{\|\max eigvec_1(B^{-1}Q_i)\|}$$

In Equation 8, $B = I_{M_t} + T^*T$, and $$T = \begin{bmatrix} \sqrt{\frac{\rho}{k}} \frac{t_{j_1}^* Q_{j_1}}{(t_{j_1}^* Q_{j_1} t_{j_1})^{1/2}} \\ \vdots \\ \sqrt{\frac{\rho}{k}} \frac{t_{j_{k-1}}^* Q_{j_{k-1}}}{(t_{j_{k-1}}^* Q_{j_{k-1}} t_{j_{k-1}})^{1/2}} \end{bmatrix}.$$

The successive user scheduling scheme may be modified using the modified SLNR of Equation 7 and the optimal transmit filter weight of Equation 8.

Designing of the transmit filter weight based on the receive filter weight may be applicable to the successive user scheduling scheme, however, such designing may be inapplicable to the exhaustive user scheduling scheme. In the case of the exhaustive user scheduling scheme, the transmitter may not use receive filter weights of other receivers as prior knowledge, and thus the modified SLNR of Equation 7 may not be computed. For example, when K=4 and M=3, that is, when three receivers among four receivers are scheduled, the transmitter may review a receiver set {1, 2, 3}. A receiver 1 may not have prior knowledge about receive filter weights of receivers 2 and 3. Accordingly, the exhaustive user scheduling scheme may obtain the transmit filter weight based on the receive filter weight shown in Equation 8.

<Adaptive Receiver Scheduling>

According to an example embodiment, there is provided a method that may decrease a complexity of a scheduling algorithm, for example, both the successive user scheduling scheme and the exhaustive user scheduling scheme, while maintaining a predetermined level of performance using long term information associated with statistics of a channel matrix.

A long term channel covariance matrix with respect to a receiver i may be associated with a channel subspace $R_i$ of the receiver i. Accordingly, $R_i$ may be used to exclude, from scheduling, receivers having a relatively high channel subspace correlation.

Singular value decompositions (SVD) of $Q_i$ and $Q_j (i \neq j)$ may be defined as, $$Q_i \stackrel{SVD}{=} A_i \Sigma_i A_i^*, \quad Q_j \stackrel{SVD}{=} A_j \Sigma_j A_j^*$$

A channel subspace correlation $e_{i,j}$ between $Q_i$ and $Q_j$ may be defined as, $$e_{i,j} = \sum_{k=1}^{r} \frac{\|A_i(:, 1:r)^* A_j(:, k)\|_2}{r}$$

Accordingly, as $e_{i,j}$ increases, the receiver i and a receiver j may have a relatively high channel subspace correlation. Since orders of i and j may not affect determination of $e_{i,j}$, $e_{i,j} = e_{j,i}$.

The receiver scheduling algorithm may be modified using $e_{i,j}$.

—Successive User Scheduling Scheme—
Initialization: $J_0=\phi$, k=1, S={1, ..., K}

$$(j_1, t_{j_1}) = \underset{i \in S, t_i}{\arg\max}\, l(1, i, t_i, J_0)$$

may be computed, and $J_1 = J_0 \cup j_1$ and $S = S \backslash j_i$ may be set.

In addition, sumrate=$\log 2(1+s(1, j_1, t_{j_1}, J_1))$ may be set.

The transmitter may compute $e_{i,j}$ with respect to all I={(i, j):1≤i<j≤K}.

$$K\left(\frac{K-1}{2}\right)$$

times of computations may be used to obtain all the $e_{i,j}$.

In addition, $G=\phi$ may be set. If $e_{i,j}>\gamma$, $G=G \cup (i, j)$ may be set with respect to all (i, j) ∈ I. That is, γ corresponds to a threshold of a channel subspace correlation so that the receiver may be scheduled.

S={l: $(j_1,l) \notin G$ or $(l, j_1) \notin G$ for $\forall l \in \{1: K\} \backslash J_1$} may be set, and $G = G \backslash ((j_1, \cdot) \cup (\cdot, j_1))$ may be set.

The following process may be repeated.

While k<M, (b) Repeat:

---

K = K + 1
for i = 1 : |S|

Compute $t_i = \underset{t}{\arg\max}\, l(k, S(i), t, J_{k-1})$

Set $J_k'' = J_{k-1} \cup S(i)$ metric(i) = $\sum_{j \in J_k^*} \log_2(1 + s(k, j, t_j, J_k''))$ end b = $\underset{i}{\arg\max}$ metric(i)

sumrate' = metric(b)
$J_k' = J_{k-1} \cup S(b)$, $S' = S \backslash S(b)$
Set $S' = \{l : (S(b), l) \notin G$ or $(l, S(b)) \notin G$ for $\forall l \in \{1 : K\} \backslash J_{k-1}\}$
if sumrate' > sumrate, set $J = J_k = J_k'$, $G = G \backslash ((S(b), \cdot) \cup (\cdot, S(b)))$, and S = S' and go to (a).
Otherwise, $J = J_{k-1}$ and break.
end While

---

J corresponds to a set of scheduled receivers, and $\{t_{j \in J}\}$ corresponds to a set of transmit filters.

—Exhaustive User Scheduling Scheme—

The exhaustive user scheduling may be performed using a receiver pruning algorithm. The successive user scheduling may be performed by associating a receiver pruning with a transmit filter design. In the case of the exhaustive user scheduling, the receiver pruning and the transmit filter design may be separately described. Initially, the receiver pruning algorithm will be described.

The transmitter may compute $e_{i,j}$ with respect to a I={(i,j): 1≤i<j≤K}.

$$K\left(\frac{K-1}{2}\right)$$

times of computations may be used to obtain all the $e_{i,j}$. Similar to the successive user scheduling, $e_{i,j}$ may be computed using the channel covariance matrix quantized based on the generated adaptive codewords.

A set of $e_{i,j}$ may be represented by G={$e_{i,j}$}, and each $e_{i,j}$ may be mapped to each branch of a descending tree with depth $M_t+1$. For example, (i, j) ∈ I may form a node i and a node j. Here, the node i corresponds to an $i^{th}$ receiver, and the node j corresponds to a $j^{th}$ receiver. $e_{i,j}$ may be assigned to a branch connecting the node i and the node j.

FIGS. 7-10 are diagrams illustrating descending tree data structures which may be used in the receiver pruning algorithm.

Figure 7:
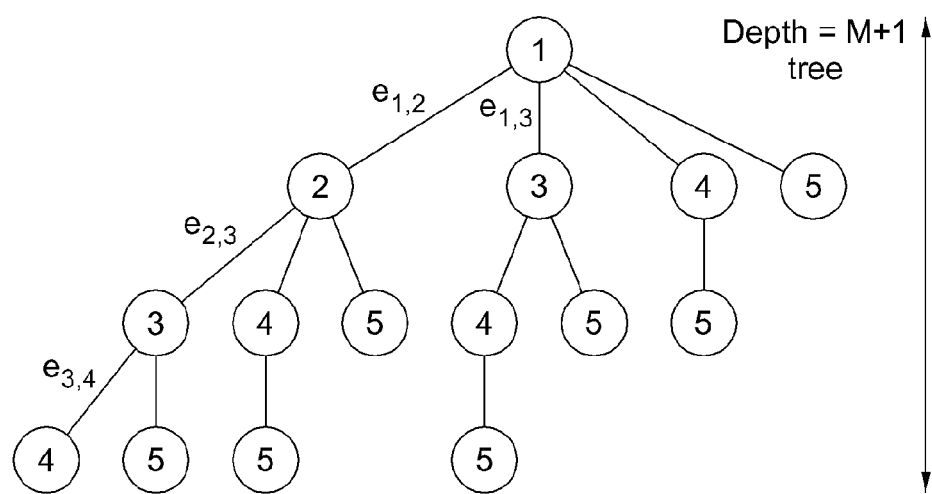
FIGS. 7-10 are diagrams illustrating descending tree data structures which may be used in a receiver pruning algorithm.

The descending tree in FIG. 7 illustrates a case in which a total number of receivers K=5, and a number of receivers to be scheduled M=3.

A threshold may be set to γ. Initialization may be performed so that k=0, Z'=φ. Window Ω=[k, k+$M_t$−1] may be set. Here, window corresponds to a portion of a descending tree.

The following process may be repeated until k=2. Here, k corresponds to a level of the descending tree and a top upper node belongs to level 1. Accordingly, when K=5 and k≥3, a path satisfying M=3 does not exist in a sub-tree and thus, may not be considered.

(a) k=k+1 may be set, and Ω=[k, k+$M_t$−1] may be set.

Figure 8:
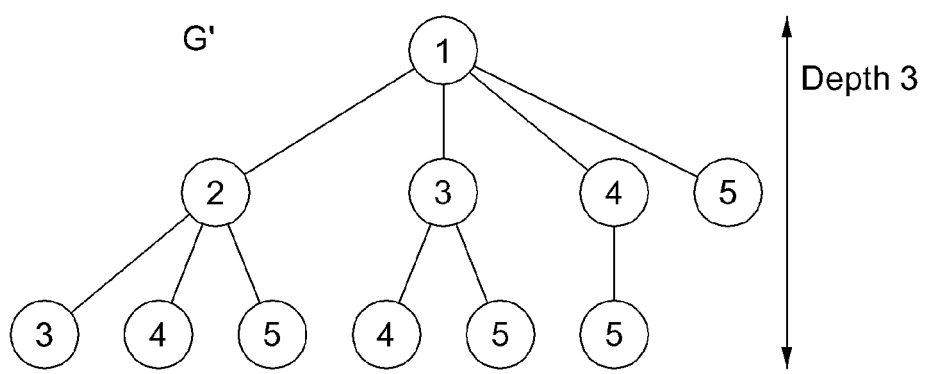

The transmitter may extract the sub-tree satisfying G' ⊂ G corresponding to Ω=[k, k+$M_t$−1]. That is, the transmitter may extract sub tree from a $k^{th}$ level of the descending tree to a $(k+M_t-1)^{th}$ level. For example, the sub-tree for k=$^1$ and Ω=[1, 3] may be given as illustrated in FIG. 8.

If $e_{i,j}>\gamma$, the transmitter may prune a lowest branch among branches connected from the node i to the node j of the sub-tree G'. The transmitter may extract all the paths connected to the depth M in the sub-tree G'. The transmitter may store the extracted paths in Z', and may return to (a) and repeat the same process.

Figure 9:
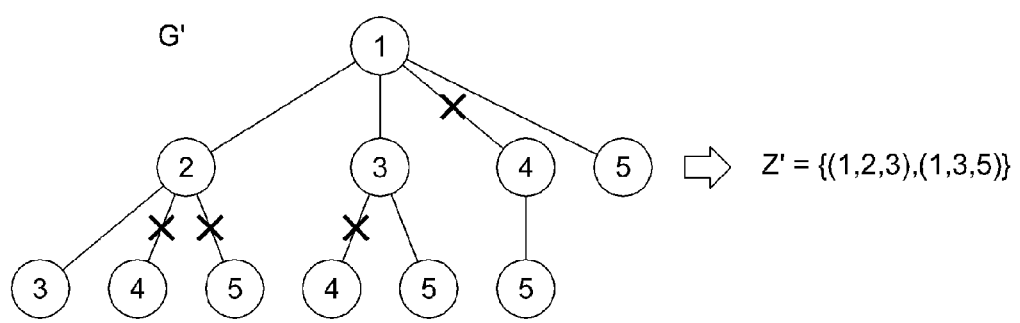

For example, when k=1, and when branches corresponding to (1,4) and (2,5) satisfy $e_{i,j}>\gamma$, the following descending tree may be given as illustrated in FIG. 9.

A path connecting the node 1 and the node 4, and a path connecting the node 2 and the node 5 may need to be eliminated. Accordingly, paths (1,2,4), (1,2,5), (1,3,4), and (1,4,5) may be eliminated, and remaining paths (1,2,3) and (1,3,5) may be stored in Z'.

Figure 10:
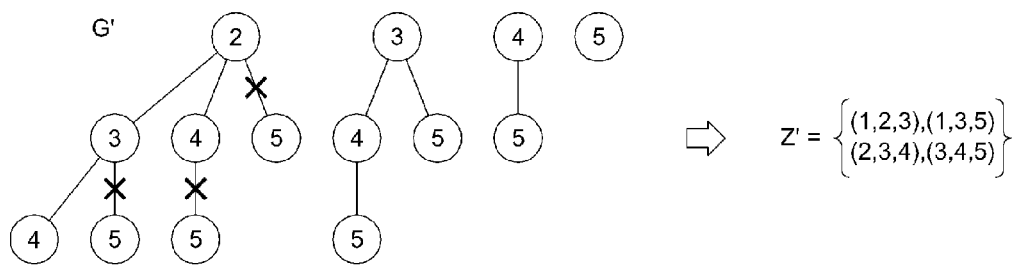

When k=2, the sub-tree may be given as illustrated in FIG. 10.

The path connecting the node 1 and the node 4, and the path connecting the node 2 and the node 5 may need to be eliminated and thus, paths (2,3,4), (2,4,5), and (2,5) may be eliminated. Remaining paths (1,2,3), (1,3,5), (2,3,4), and (3,4,5) may be stored in Z'.

Accordingly, sets of receivers stored in Z' may become candidates employing a channel correlation. The exhausting user scheduling scheme may be modified by changing Z of the aforementioned-basic exhaustive user scheduling scheme- to Z'.

Figure 3:
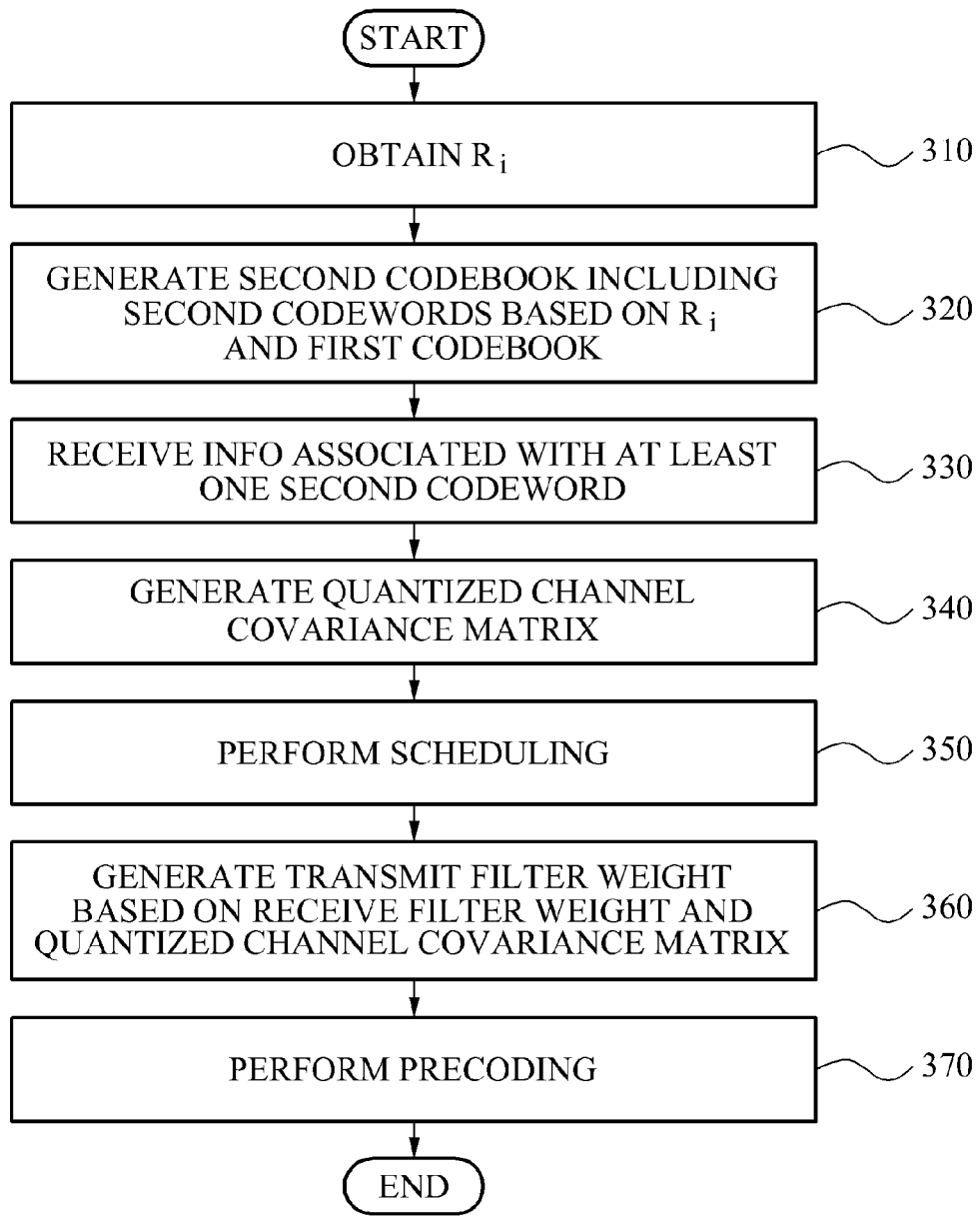
FIG. 3 is a diagram illustrating an example of a communication method of a transmitter in a MIMO communication system.

FIG. 3 illustrates an example of a communication method of a transmitter in a MIMO communication system.

Referring to FIG. 3, in operation 310, the transmitter may obtain a matrix R, associated with statistics of a channel matrix between the transmitter and a receiver. Here, i corresponds to an index of the receiver, and $R_i$ may be obtained by statistically analyzing information fed back from the receiver. The transmitter may obtain a matrix associated with the statistics of the channel matrix with respect to other receivers.

In operation 320, the transmitter may generate second codewords corresponding to first codewords included in a first codebook within a set including unitary matrices, based on the matrix $R_i$ associated with the statistics of the channel matrix between the transmitter and the receiver. A set of second codewords corresponds to a second codebook. In this example, the first codebook may correspond to a base codebook, the first codeword may correspond to a base codeword, the second codebook may correspond to an adaptive codebook, and the second codeword may correspond to an adaptive codeword.

In operation 330, the transmitter may receive, from the receiver, information associated with at least one second codeword selected by the receiver from the second codewords. Information associated with the selected at least one second codeword may include information associated with at least one codeword index corresponding to the selected at least one second codeword, or information associated with at least one quantized channel covariance matrix that is computed based on the selected at least one second codeword.

In operation 340, the transmitter may generate a quantized channel covariance matrix based on the received information associated with the selected at least one second codeword.

In operation 350, the transmitter may perform receiver scheduling based on a channel subspace correlation using the quantized channel covariance matrix. For example, the transmitter may determine receivers to be excluded from scheduling through a comparison between the channel subspace correlation and a threshold.

In response to the receiver being scheduled, the transmitter may generate a transmit filter weight of the transmitter, based on a receiver filter weight of the receiver and the quantized channel covariance matrix in operation 360.

In operation 370, the transmitter may perform precoding based on information associated with the selected at least one second codeword. For example, the transmitter may precode data streams based on the transmit filter weight.

Figure 4:
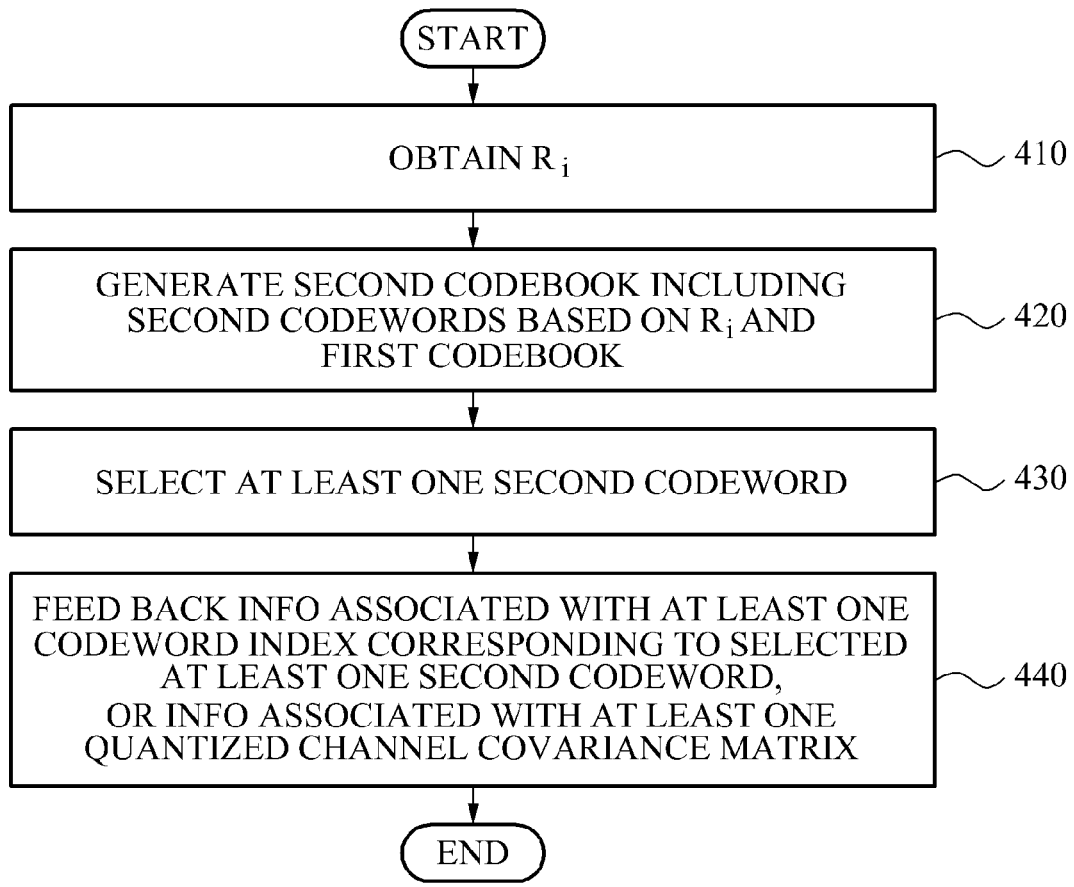
FIG. 4 is a diagram illustrating an example of a communication method of a receiver in a MIMO communication system.

FIG. 4 illustrates an example of a communication method of a receiver in a MIMO communication system.

In operation 410, the receiver may obtain a matrix $R_i$ associated with a channel matrix between a transmitter and the receiver. Here, i corresponds to an index of the receiver, and $R_i$ may be obtained by statistically analyzing channel information estimated based on a pilot received from the transmitter.

The receiver may generate second codewords corresponding to first codewords included in a first codebook within a set including unitary matrices, based on the matrix $R_i$ associated with the statistics of the channel matrix. In operation 420, the receiver may generate a second codebook including the second codewords that are unitary matrices, based on $R_i$ and the first codebook. In this example, the first codebook may correspond to a base codebook, the first codeword may correspond to a base codeword, the second codebook may correspond to an adaptive codebook, and the second codeword may correspond to an adaptive codeword. The transmitter may also generate the same codebook as the receiver.

In operation 430, the receiver may quantize a channel formed between the transmitter and the receiver by selecting at least one second codeword from the second codewords. The receiver may feed back, to the transmitter, information associated with the selected at least one second codeword. In operation 440, the receiver may feed back, to the transmitter, information associated with at least one codeword index corresponding to the selected at least one second codeword, or information associated with at least one quantized channel covariance matrix that is generated based on the selected at least one second codeword.

Figure 5:
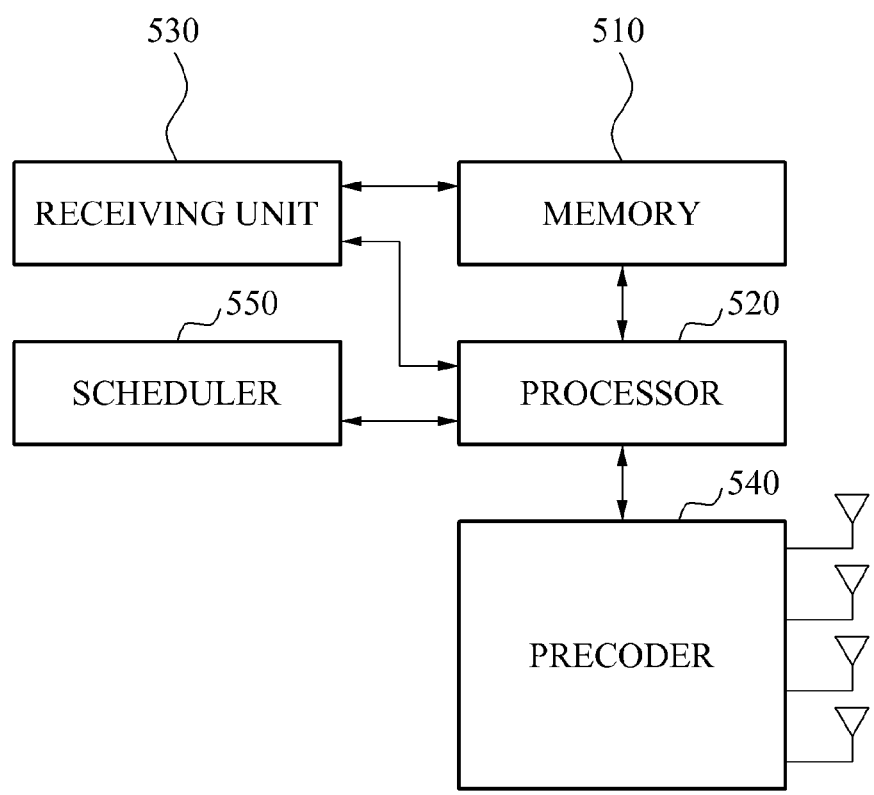
FIG. 5 is a diagram illustrating an example of a transmitter.

FIG. 5 illustrates an example of a transmitter.

Referring to FIG. 5, the transmitter may include a memory 510, a processor 520, a receiving unit 530, a precoder 540, and a scheduler 550.

The memory 510 may store a first codebook. The memory 510 may also store information received by the receiving unit 530, and a second codebook.

The processor 520 may generate second codewords corresponding to first codewords included in the first codebook within a set including unitary matrices, based on a matrix $R_i$ associated with statistics of a channel matrix between the transmitter and a receiver. The processor 520 may additionally use CQI to generate the second codewords. In response to the receiving unit 530 receiving information associated with at least one codeword index corresponding to the selected at least one second codeword, the processor 520 may generate at least one quantized channel covariance matrix based on the at least one codeword index.

The processor 520 may generate a transmit filter weight of the transmitter, based on a receive filter weight of the receiver and the at least one quantized channel covariance matrix that is computed based on information associated with the selected at least one second codeword.

The receiving unit 530l may receive, from the receiver, information associated with the at least one second codeword selected by the receiver from the second codewords.

The precoder 540 may perform precoding based on information associated with the selected at least one second codeword. For example, the precoder 540 may perform precoding based on the at least one quantized channel covariance matrix that is computed based on information associated with the selected at least one second codeword. The precoder 540 may perform precoding using the transmit filter weight that is generated based on the at least one quantized channel covariance matrix.

The scheduler 550 may compute a channel subspace correlation between the receiver and at least one second receiver different from the receiver, using at least one quantized channel covariance matrix that is computed based on the received information associated with the at least one codeword, and a quantized channel covariance matrix of the at least one receiver, and may perform scheduling based on a comparison between the channel subspace correlation and a threshold.

Figure 6:
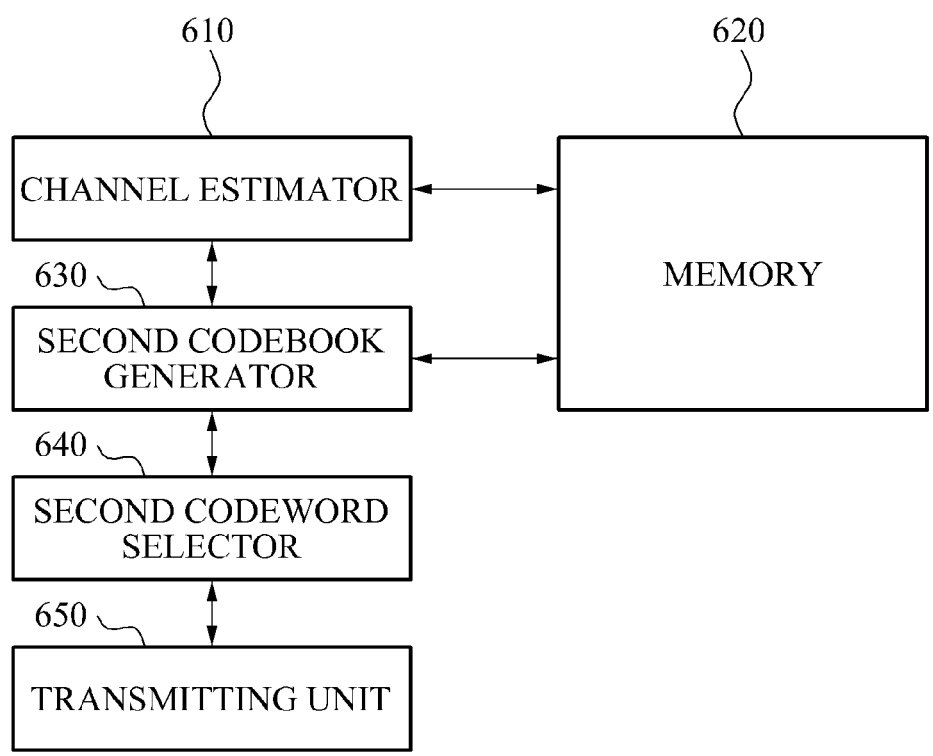
FIG. 6 is a diagram illustrating an example of a receiver.

FIG. 6 illustrates an example of a receiver.

Referring to FIG. 6, the receiver may include a channel estimator 610, a memory 620, a second codebook generator 630, a second codeword selector 640, and a transmitting unit 650.

The channel estimator 610 may receive a pilot from a transmitter to estimate a channel formed between the transmitter and the receiver, and may generate a channel matrix between the transmitter and the receiver. The channel estimator 610 may observe the channel matrix for a long term and generate a matrix associated with statistics of the channel matrix.

The memory 620 may store information generated by the channel estimator 610 and a first codebook. The memory 620 may also store a second codebook.

The second codebook generator 630 may generate second codewords corresponding to first codewords included in the first codebook within a set including unitary matrices, based on a matrix associated with statistics of the channel matrix between the transmitter and the receiver. The second codebook generator 630 may additionally use CQI to generate the second codewords.

The second codeword selector 640 may quantize a channel between the transmitter and the receiver by selecting at least one second codeword from the second codewords.

The transmitting unit 650 may feed back, to the transmitter, information associated with the at least one second codeword selected by the second codeword selector 640. The fed back information may include information associated with at least one codeword index corresponding to the selected at least one second codeword, or information associated with the at least one quantized channel covariance matrix that is computed based on the selected at least one second codeword.

The transmitter, the receiver, and the communication method of the transmitter and the receiver according to various example embodiments are described above. Descriptions made above with reference to FIG. 1 and FIG. 2 may be applicable to the communication method of the transmitter and the receiver, and thus further detailed descriptions will be omitted here.

The processes, functions, methods and/or software described above including a communication method of a receiver and a transmitter may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and non-transitory computer-readable codes or program instructions may be stored and executed in a decentralized manner.

A number of various examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a transmitter, the method comprising:
generating second codewords corresponding to first codewords included in a first codebook within a set including unitary matrices, based on a matrix associated with statistics of a channel matrix between the transmitter and a receiver;
receiving, from the receiver, information associated with at least one second codeword selected by the receiver from the generated second codewords;
computing a channel subspace correlation between the receiver and at least one second receiver different from the receiver, based on at least one quantized channel covariance matrix that is computed based on the received information associated with the selected at least one codeword, and a quantized channel covariance matrix of the at least one receiver;
performing scheduling based on a comparison between the channel subspace correlation and a threshold; and
performing precoding based on information associated with the selected at least one second codeword in response to the receiver being scheduled.

2. The communication method of claim 1, wherein the generating comprises:
generating the second codewords corresponding to the first codewords included in the first codebook within the set including the unitary matrices, based on the matrix associated with the statistics of the channel matrix and a matrix associated with channel quality information.

3. The communication method of claim 1, wherein the generating comprises:
generating the second codewords corresponding to the first codewords using a Procrustes optimization scheme.

4. The communication method of claim 1, wherein the receiving comprises:
receiving information associated with at least one codeword index corresponding to the selected at least one second codeword, or information associated with at least one quantized channel covariance matrix that is computed based on the selected at least one second codeword.

5. The communication method of claim 1, wherein the performing precoding comprises:
generating at least one quantized channel covariance matrix based on at least one codeword index corresponding to the selected at least one second codeword, in response to the received information associated with the selected at least one second codeword including information associated with the at least one codeword index; and
performing precoding based on the at least one quantized channel covariance matrix.

6. The communication method of claim 1, wherein the performing precoding comprises:
performing precoding based on at least one quantized channel covariance matrix in response to the received information associated with the selected at least one second codeword including information associated with the at least one quantized channel covariance matrix that is computed based on the selected at least one second codeword.

7. The communication method of claim 1, wherein the performing precoding comprises:
generating a transmit filter weight of the transmitter, based on a receive filter weight of the receiver and at least one quantized channel covariance matrix that is computed based on the received information associated with the selected at least one second codeword; and performing precoding using the transmit filter weight.

8. A communication method of a receiver, the method comprising:
generating second codewords corresponding to first codewords included in a first codebook within a set including unitary matrices, based on a matrix associated with statistics of a channel matrix between a transmitter and the receiver;
selecting at least one second codeword from the generated second codewords; and
feeding back, to the transmitter, information associated with the selected at least one second codeword, wherein the feeding back comprises:
generating at least one quantized channel covariance matrix based on the selected at least one second codeword; and
feeding back, to the transmitter, information associated with the at least one quantized channel covariance matrix,
wherein the transmitter computes a channel substance correlation between the receiver and at least one second receiver different from the receiver, based on the at least one quantized channel covariance matrix and a quantized channel covariance matrix of the at least one receiver.

9. The communication method of claim 8, wherein the generating comprises:
generating the second codewords corresponding to the first codewords included in the first codebook within the set including the unitary matrices, based on the matrix associated with the statistics of the channel matrix and a matrix associated with channel quality information.

10. The communication method of claim 8, wherein the generating comprises:
generating the second codewords corresponding to the first codewords using a Procrustes optimization scheme.

11. The communication method of claim 8, wherein the feeding back comprises:
feeding back, to the transmitter, information associated with at least one codeword index corresponding to the selected at least one second codeword.

12. A transmitter, comprising:
a memory to store a first codebook;
a processor configured to generate second codewords corresponding to first codewords included in a first codebook within a set including unitary matrices, based on a matrix associated with statistics of a channel matrix between the transmitter and a receiver;
a receiving unit configured to receive, from the receiver, information associated with at least one second codeword selected by the receiver from the generated second codewords;

a scheduler to compute a channel subspace correlation between the receiver and at least one second receiver different from the receiver, based on at least one quantized channel covariance matrix that is computed based on the received information associated with the selected at least one codeword and a quantized channel covariance matrix of the at least one receiver,
and to perform scheduling based on a comparison between the channel subspace correlation and a threshold; and
a precoder configured to perform precoding based on information associated with the selected at least one second codeword in response to the receiver being scheduled.

13. The transmitter of claim 12, wherein the processor is configured to generate the second codewords corresponding to the first codewords included in the first codebook within the set including the unitary matrices, based on the matrix associated with the statistics of the channel matrix and a matrix associated with channel quality information.

14. The transmitter of claim 12, wherein the processor is configured to generate the second codewords corresponding to the first codewords using a Procrustes optimization scheme.

15. The transmitter of claim 12, wherein the receiving unit is configured to receive information associated with at least one codeword index corresponding to the selected at least one second codeword, or information associated with at least one quantized channel covariance matrix that is computed based on the selected at least one second codeword.

16. The transmitter of claim 12, wherein in response to the receiving unit receiving information associated with at least one codeword index corresponding to the selected at least one second codeword,
the processor is configured to generate at least one quantized channel covariance matrix based on the selected at least one codeword index, and
the precoder is configured to perform precoding based on the at least one quantized channel covariance matrix.

17. The transmitter of claim 12, wherein in response to the receiving unit receiving information associated with at least one quantized channel covariance matrix that is computed based on the selected at least one second codeword, the precoder is configured to perform precoding based on the at least one quantized channel covariance matrix.

18. The transmitter of claim 12, wherein:
the processor is configured to generate a transmit filter weight of the transmitter, based on a receive filter weight of the receiver and at least one quantized channel covariance matrix that is computed based on the received information associated with the selected at least one second codeword, and
the precoder is configured to perform precoding using the transmit filter weight.

* * * * *